United States Patent [19]

Horn

[11] 4,188,200
[45] Feb. 12, 1980

[54] METHOD AND APPARATUS FOR PRODUCTION OF PLATE GLASS

[76] Inventor: Hannes S. Horn, Im Defdahl 51, 4600 Dortmund 1, Fed. Rep. of Germany

[21] Appl. No.: 954,588

[22] Filed: Oct. 25, 1978

[30] Foreign Application Priority Data

Oct. 26, 1977 [DE] Fed. Rep. of Germany ....... 2747832
Oct. 26, 1977 [DE] Fed. Rep. of Germany ....... 2747834

[51] Int. Cl.² .............................................. C03B 5/26
[52] U.S. Cl. ..................................... 65/90; 65/99 A; 65/99 R; 65/182 R; 65/327; 65/333
[58] Field of Search ................. 65/90, 327, 333, 99 R, 65/99 A, 182 R

[56] References Cited

U.S. PATENT DOCUMENTS

| | | | |
|---|---|---|---|
| 1,266,011 | 5/1918 | Good, Jr. | 65/327 |
| 3,420,650 | 1/1969 | Humphreys | 65/90 |
| 3,442,636 | 5/1969 | Kita et al. | 65/99 A X |
| 3,576,612 | 4/1971 | Prislan | 65/182 R |

FOREIGN PATENT DOCUMENTS 7034642 9/1977 Japan ........................................ 65/99 A

*Primary Examiner*—Arthur D. Kellogg
*Attorney, Agent, or Firm*—Hill, Van Santen, Steadman, Chiara & Simpson

[57] ABSTRACT

A nozzle system is disclosed for the production of a wide band of flat plate glass in which the glass flows out of a nozzle orifice of a flat nozzle formed by two nozzle bars. One of the nozzle bars has a nozzle forming portion which is selectively elastically deformable. The other nozzle bar is of rigid construction. Deforming members are provided to selectively deform the one nozzle bar so as to reduce distortions occurring in the plate glass bands. The other nozzle bar is connected to an adjusting member for controlling an overall spacing with respect to the first nozzle bar so as to adjust overall glass thickness. A process computer may be employed to compare measuring values obtained from points along the deformable portion of the one nozzle bar with a model of a desired curvature stored in the computer.

20 Claims, 6 Drawing Figures

METHOD AND APPARATUS FOR PRODUCTION OF PLATE GLASS

BACKGROUND OF THE INVENTION

The invention relates to a method of production of flat or plate glass, particularly for wide bands of plate glass, in which the glass issues from the nozzle orifice of a flat nozzle which is formed by two nozzle bars.

The most important method of plate glass production is, for example, the float-glass method. In this method, liquid glass is conveyed to a metal smelt or to a layer of molten metal where it spreads out in a uniform thickness continuously on a completely level surface. The glass spread out on the surface of the molten metal is continuously drawn off so that there results a flat glass band with adequate tolerance. The method supplies glass of proper tolerance with good optical characteristics. Of disadvantage, however, is the great expense with this method which results from the operation of the molten metal bath, particularly since the liquid metal must be held under a protective gas atmosphere. Additionally, it is disadvantageous that float glass installations may operate solely with relatively large quantities of output.

SUMMARY OF THE INVENTION

It is an object of the invention to provide a method for production of plate glass in which the disadvantages noted above are prevented and in which, without subsequent alteration of the thickness of width of the glass band after issue from the furnace, a glass band free from distortion is present with final dimensions determined essentially by means of a nozzle from which the glass issues.

The object is attained in that the distortion of the nozzle bars being adjusted during operation is counteracted at least partially through a controlled deformation of one or both nozzle bars compensating the distortion. Through this technique it advantageously results that the unavoidable distortion may be solved in a wide nozzle for plate glass (from which the plate glass issues at 900° to 1100° C. and on an average of approximately 1000° C.). This unavoidable distortion was previously regarded as one of the main hindrances for the use of a nozzle determining final dimensions. The distortion occurs particularly when the nozzle is made of metal because of separating procedures in the high heat resistant steel and its coating; because of residual stresses which have resulted upon the finishing and which residual stresses weaken in the area of the operating temperature; and because of different thermal influences which take effect by the nozzle securement, the glass, the cooling medium, and the atmosphere on the nozzle bars.

In one embodiment of the invention, one of the nozzle bars, particularly a fixed supported bar, is controlled according to shape and is adjusted through distortion of the bar for the adjustment of the thickness of the glass band. With this technique, a bar, particularly the bar movable for the adjustment of the thickness of the glass band, remains uninfluenced and the other bar is controlled in its shape according to the movable bar. With this technique, a better and simpler embodiment then occurs than if the deformation to be adjusted would be controlled through distortion of both bars. A prerequisite for this embodiment is that the distortion of the non-compensating controlled bars changes in operation only in the area in which the other bar may follow in a controlled manner. This is attainable through a compact, solid embodiment of the noncompensating controlled bar.

In a further embodiment of the invention, the form of the bar is measured continuously by means of measuring the position of previously determined points. The measuring values are then used for the control of the bar shape. Through the measuring of distinct points lying close to one another, it is advantageously possible to determine sufficiently accurately the deformation of the bars in reference to one another and to take as first controller outputs for the adjustment of the bar to be guided the deviations of the distances of the measuring points from one another. Within the framework of measuring accuracy wherein the measuring may be done in the temperature range of several hundred degrees, that is, in the interior of the nozzle bars, a maintenance of the thickness tolerances of the glass band is insured to a large extent.

In a further embodiment of the invention, the measuring values are supplied to a computer which determines the correction values and controls adjustment members for the deformation. The nozzle bar which is fixed and is an elastic body, is deformed according to a predetermined deflection curve. This means that an adjusting operation at one end of the bar causes changes also in the center or indeed at the other end of the nozzle bar. A simple follow-up of the special measuring points leads, therefore, to a complicated reaction with feedback effects. The advantageous utilization of a process computer which calculates in advance the particular effects which result by means of the adjusting command makes it possible to optimally control the adjustment members for the deformation of the nozzle bar upon consideration of the mutual influencing of the adjustments.

In a development of the invention it is furthermore provided that the computer determines the correction values of the nozzle bar shape through a stored shape of the die of the nozzle bar. Through the use of a stored die shape of the nozzle bar, the computer may simply calculate the effect of an adjusting command on the deflection curve bending line of the entire bar. Therefore optimizing calculations are possible which keep the degree of bending of the nozzle bar as a whole as low as possible. Corresponding calculations are facilitated through the relative slowness with which the form of the nozzle is altered.

In a development of the invention, it is further provided that the thickness of the glass band behind the nozzle is continuously measured and is supplied to the computer as a superimposed standard. The glass band thickness which may, for example, be continuously optically measured on the glass band which issues from the nozzle, is a particularly advantageous superimposed standard size, because the adaptability of the end product is directly dependent upon the glass thickness and uniformity. The measured value must accordingly always lie within the range of tolerance. The glass band thickness is therefore advantageously used for the purpose of constantly examining the adjustment of the nozzle bar and if necessary to equalize other influences, for example of temperature differences in the nozzle orifice. The measuring value which shows the effect of an adjusting command is first obtainable with a delay after the adjustment command is equalized through a constant tendency or trend supervision. The computer accordingly calculates continuously the tendency or trend with which the thickness of the glass band changes at special locations and imparts its adjusting commands to counteract the tendency or trend before the thickness of the glass band reaches the tolerance limits. In the tendency or trend calculation, the glass temperature likewise measured at special points also enters into the calculation of the tendency.

In another development of the invention the values determined by the measuring devices are delivered to an adjusting or regulating system which, with the thickness of the glass band as a superimposed value, controls after-heating electrodes arranged in front of the nozzle as well as the geometry of the nozzle. Thus, the main errors which lie in the deviations of the nozzle geometry and in the non-homogeneousness of the glass are overcome. Therefore it is particularly advantageous that the after heating electrodes and the nozzle geometry may be so controlled by the computer that they supplement themselves.

In a development of the invention the heating of the smelting furnace is so controlled that the glass temperature at the outlet of the smelting furnace remains constant at a pre-selected temperature. Through this additional regulation, the viscosity of the glass is constant at the occurring inhomogeneities and thus at the same glass surface condition a constant outlet-speed of the glass from the nozzle also results. Therefore it is possible to simplify the regulation and control of the removal of the glass band from the nozzle and to exclude additional disturbing factors which would otherwise result. The glass temperature, by being held constant, also works out advantageously for the regulation of the after heating electrodes.

In a further development of the invention, the measuring of the temperature in the nozzle supply channel takes place at several points which are distributed preferably in the form of a network uniformly over the cross-section. The measurements in the network-shaped arrangement results not only in a similarity of the temperature distribution over the nozzle length, it also advantageously permits the advance calculation of the mixing temperature being established in the nozzle which results from the temperature differences of the individual layer levels.

It is provided in this connection that the measuring of the glass temperature takes place by means of measuring the electric resistance of the glass smelt, particularly in a bridge circuit. Through temperature measuring via the electric resistance of the glass smelt, which is possible since the electric resistance of the glass smelt is dependent on temperature, a contactless measuring method therefore results by which inserts in the nozzle supply channel may be eliminated. This temperature measurement also has the advantage of determining an average temperature over the measured distance so that a special calculation of the average value may be eliminated.

As an alternative, the glass temperature, particularly for the control of the temperature measurement may be measured via the resistance, also through thermo-elements. Through the insertion of thermo-elements, particularly NiCr-Ni-thermo elements, there results an advantageously simple temperature measuring possibility which may serve for the control of the resistance measurement. Furthermore, through thermo-elements, temperature inhomogeneities may be discovered which do not influence the average temperature. Likewise, also the introduction of insufficiently refined glass into the nozzle supply channel may be recognized, since on account of the altered electric resistance of the glass, thermo-element and resistance measuring no longer correspond.

For regulation in one embodiment of the invention, by use of contactless operating traversing measuring devices the temperature and temperature distribution of the glass band issuing from the nozzle are continuously measured and are delivered as correction dimensions to the controllers for the after-heating electrodes. Through this further control measurement of the temperature and temperature distribution, by consideration of the cooling occurring, both the safety or reliability of the resistance measuring as well as the thermo-element measurement may be increased. Furthermore, through the measurement over the entire width of the band, it may be determined whether between the measuring levels in front of the nozzle there are areas of higher or lower temperature, and how great are the maximum and minimum temperatures in relation to the temperatures of the measuring levels.

For carrying out the regulation, the glass thickness is continuously measured, particularly by means of a traversing measuring device, and that preferably by means of sensors which are inwardly of the nozzle bars at reference points a continuous measurement of the nozzle geometry takes place. As the object of the production method is a band of plate glass in line with a desired tolerance, it is particularly advantageous to provide the thickness of the glass band as a regulating value for the nozzle and the after-heating electrodes. In order to facilitate the regulation, the nozzle geometry is also directly measured at reference points, so that both the nozzle geometry at the reference points as well as also the thickness of the glass band and its extent may be utilized for the regulation. Also, through the continuous measuring which is carried out through optical measuring devices used in the trade, for example, laser-measuring devices, the zones between the reference points may be determined. The distribution curve of the glass band thickness is therefore the optimal regulating size for the adjustment of the nozzle deflection curve bending line. The reference points have in this connection a control function, with the aid of which it can be determined whether deviations in measurement of the glass band have as a cause the shape of the nozzle or as their cause inhomogeneities in the glass, for example, the temperature.

In a development of the invention, it is further provided that the individual adjusting or regulating operations are controlled by a process computer which continuously determines from the measuring values present the tendency of their changes and utilizes the tendency for counter control. Through the initiation of the process computer which controls the nozzle bars, for the other regulating operations it is possible to combine the individual regulating operations and also on the basis of models to improve them through optimizing calculations. Thus, for example, with the aid of optimizing calculations, the influence of a change in the viscosity of the smelt may be utilized in such manner that adjustments of the nozzle bar already taken place may be cancelled. Therefore it is insured that a sufficient adjustment range of the adjustment size of nozzle bar is always present. Through consideration of the tendency of the measuring values, it may be taken into account that the measurements of the thickness of the glass band and the temperature distribution in the glass band may take place, not in the nozzle, but behind and therefore the condition of the issuing glass in the nozzle may be conveyed only with delay to the computer. Through the utilization of the tendency for the regulation and control of the method, this delay may be taken into account.

The individual measuring values, before their use in the computer, are subjected to a plausibility or probability control which separates out improbable values and replaces them by extrapolated values corresponding to the tendency or trend. Therefore a defective behavior of the computer on account of false measuring values, for example through electric or other disturbances which occur in the system, is out of the question. Through the plausibility control it is also possible that the computer tests the function of the measuring devices which supply the measuring values and which do not withstand the plausibility or probability control, and in the case of a defect the computer gives a corresponding indication. Through the plausibility control, the reliability of the regulation is appreciably enhanced and the possibility of defective adjustments is excluded as far as technically possible.

In a development of the invention, it is provided that the computer contains process models and through the same calculates in advance the effect of the individual adjusting commands on the course of the process. With the aid of the process models stored in the computer, for example, for the temperature equalization of the nozzle bar adjustment as well as for the system glass temperature and distribution, nozzle geometry, and glass band tolerance, a particularly good process control is possible.

It is provided in this connection that the computer contains standard process models and examples of disturbance models. Through the disturbance models, consideration may be directed to special conditions of operation, for example when harmful brickwork or masonry parts, for example, an inlet-sill cannot immediately be repaired. Other disturbance models may pertain to the starting and shutting-off of the installation, so that the computer may during such difficult periods perform control for the attendant personnel.

For carrying out the method of production of glass plate there is provided a nozzle out of which the glass issues and where at least one of the two nozzle bars which forms the nozzle is constructed elastically deformably. This elastically deformable nozzle bar has adjusting members for the deformation directed at it. Through these adjusting members there results the possibility of subjecting the nozzle bars to an intended deformation. It is particularly advantageous to permit the solid nozzle bar to have a distortion and at adjust the elastically deformable nozzle bar so that the adjustable bar follows the other distorted bar in its contour. Thus a nozzle orifice may be formed which is indeed itself curved. The nozzle bars, however, maintain a narrow tolerance spacing from one another.

In the practice of the invention it is provided in this connection that the nozzle bars have measuring members for the indication of the position of reference points in the deflection curve bending line, and located particularly in the interior of the bars. Through measuring members which measure the position of reference points in the interior of the bars, it is possible with the aid of the process computers to determine the deformation curves of the bars. As measuring members, capacitative or inductive transmitters may be provided which measure without contact. Through the arrangement in the interior of the bars, the measuring members are protected from damages and other influences so that their measuring accuracy may remain uninfluenced for a long time. A continuous measuring of the position of the reference points thus is possible relatively simply with 1/100 millimeter accuracy. The measuring accuracy of the nozzle form is accordingly 10 times as large as the accuracy with which the spacing of the two nozzle bars from one another must be maintained.

It is provided that the elastically deformable bar is constructed as a thin-walled shell which is tensioned or clamped advantageously on one side and is provided with adjusting members engaging on the free side. Through the construction of the elastically deformable bar as a thin-walled shell, a stable part is provided which may be deformed with relatively low forces by means of the thinness of its walls. By clamping on one side, which takes place particularly on the furnace side, a sufficient stability of the shell is insured. Therefore it is possible to undertake the deformation in a transverse direction of the bar so that a translation effect occurs and the adjusting path of the adjusting member for the attainment of a determined constriction of the nozzle orifice amounts to a multiple of the nozzle orifice constriction. For this reason, the adjusting members are arranged on the side of the bar lying opposite the clamping side. The engagement direction of the adjusting members is, in this connection, selected so that the basic shape of the thin-walled shell is not substantially altered and only the narrowest point is influenced. The elastically deformable bar consists advantageously of high heat-resistant metal which advantageously is provided with a surface coating, for example, tungsten carbide or titanium carbide. Through the construction of the elastically deformable bar as a high heat-resistant metal structural part there advantageously results the possibility of a simple coating, for example with tungsten carbide or titanium carbide. The application of the protective layer to the high heat-resistant metal takes place through sintering or plating. At the temperature at which the glass discharges from the nozzle, namely, circa 1,000° C., sintered carbide coatings of very great resistance or wear are available. Through the protective layer, a nozzle life of several thousand hours may be attained. At the same time, through the coating, particularly when the sintering method is employed, a simple repair of the nozzle bar is possible, as damaged places are simply newly coated and may be thereafter ground sharpened. As a basic metal of the nozzle bars high heat-resistant steel alloys or Ni and Co basis alloys may be employed. The processing of the carbide layers is possible with diamond grinding discs by embedding the carbide grains in a Ni-matrix, or by use of corundum discs.

In further development of the invention, the nozzle bars are provided with apparatus for the supply of heating and cooling media. Through a controlled heating or cooling, respectively, of individual sectors or parts of the nozzle bars, advantageously the distortion of the nozzle bar may be influenced for a long period. Furthermore, it is possible to selectively cool or heat the measuring members for the indication of the position of the reference points of the deflection curve bending lines so that the measuring devices operate at constant temperature.

For the supervision of the band of plate glass, behind the nozzle at least one measuring device for the thickness of the glass band is arranged which advantageously continuously traversely measures the thickness of the glass band. Through the measuring device arranged behind the nozzle, the thickness of the glass band is constantly supervised. Furthermore, continuous measuring values for the calculation of the nozzle geometry are available to the process computer since the glass thickness is in close reference to the nozzle geometry. It is in this connection particularly advantageous to utilize a continuous measuring device, as thus the progress of the thickness of the glass over the width of the nozzle may be exactly entered in the computer. In this manner, also the areas lying between the reference points may be detected. With the aid of the model stored in the computer the deformation of the nozzle bar over its entire length may then be calculated without gaps. The reference points may therefore have a relatively great spacing.

Furthermore, it is provided in a development of the invention, that for the regulation of deformation of the nozzle bar and the further regulating of control loops a computer is present which is programmable with a model of the nozzle bar. The provision of a process computer for the guidance of the production method is not absolutely necessary, as the process may also be carried out through normal control units which are combined with one another. Through the use of a process computer with a stored model, however, the tolerance of the finished plate glass may be improved and the method optimized.

Furthermore, in a development of the invention at least one of the nozzle bars, particularly the freely deformable nozzle bar, is positioned at individual points. Through the positioning at individual points there results advantageously an easier advance calculation of the nozzle bar bending line. Furthermore, with very large deformations, an advantageous post-alignment is made possible through adjustment of the individual bearing points.

DESCRIPTION OF THE PREFERRED EMBODIMENTS

Figure 1:
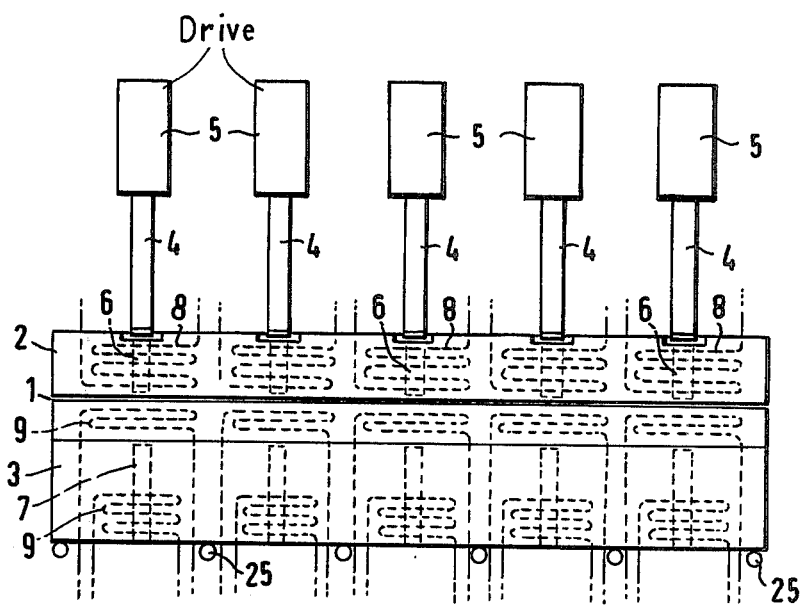
FIG. 1 illustrates a glass nozzle from the discharge side for the glass band.

In FIG. 1, the reference character 1 designates the nozzle orifice which is located between the upper preferably deformably constructed nozzle bar 2 and the lower preferably rigidly constructed nozzle bar 3 adjustable in height. On the upper nozzle bar 2 several adjusting members 4 are engaged and whose drive units 5 may be constructed hydraulically or mechanically such as through differential spindles. The number of adjusting members 4 is dependent upon the length of the nozzle and is advantageously uneven, for example, 5, 7 or 9. Within the nozzle bars 2 and 3 are arranged measuring devices which are located in receiving apertures 6 and 7. Their number is at least equal to the number of adjusting members or is a multiple thereof. The two nozzle bars 2 and 3 are divided into sections which are or may be heated or cooled, respectively by means of the devices 8 and 9. The heating or cooling media is advantageously circulated in order to prevent impurities in the heating or cooling devices 8 and 9. The upper nozzle bar 2, which advantageously is constructed as a thin walled shell, is generally one piece. The other nozzle bar 3 advantageously adjustable as a whole may, to the contrary, be composed of individual sections. In order to achieve for this nozzle bar 3 an unhindered uniform deformation, it is advantageously positioned on individual bearing points 25 which are constructed as a statically determined bearing.

Figure 2:
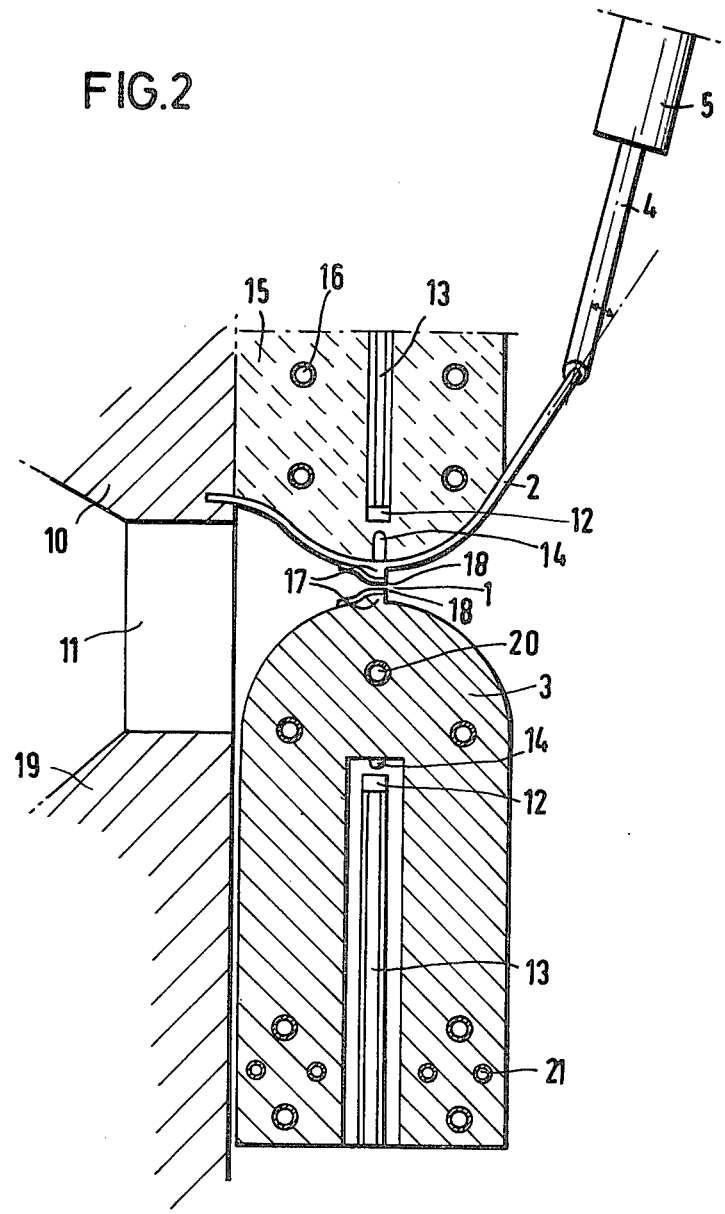
FIG. 2 shows the nozzle in cross-section.

From FIG. 2 a more detailed view of the construction of the nozzle bars 2 and 3 may be seen. The nozzle bar 2 capable of deformation and which is arranged above, for example, is through insertion in a recess connected with the end 10 of the nozzle channel 11. In its interior lie the measuring devices 12, which indicate the position of the reference points 14. The measuring devices 12 are arranged on a carrier apparatus 13. The reference points 14 are in a fixed connected manner with the thin walled shell 2. The space within the thin walled shell 2 is filled with insulating material 15 which is likewise elastically deformable. In the insulating material 15 lie the heating or cooling elements 16, respectively. The nozzle orifice 1 lies between the adjustably constructed nozzle bar 2 and the preferably solid bar 3. Both the nozzle bar 2 as well as also the nozzle bar 3 may have lips 17 which are coated securely against wear with thin layers 18, for example, of carbide. The lips 17 permit only a very small and narrow surface of the nozzle to be subjected to the wearing effect of the discharging glass. Through the coating, advantageously the lifting of the nozzle is appreciably increased.

The solid nozzle bar 3 preferably lying below and movable for the adjustment of the glass band drawing, has in its interior the measuring devices 12 on the bearing apparatus 13. It is arranged movably in front of the lower part 19 of the nozzle channel 11. As with the other nozzle bar, it has heating and cooling devices 20 and 21.

Figure 3:
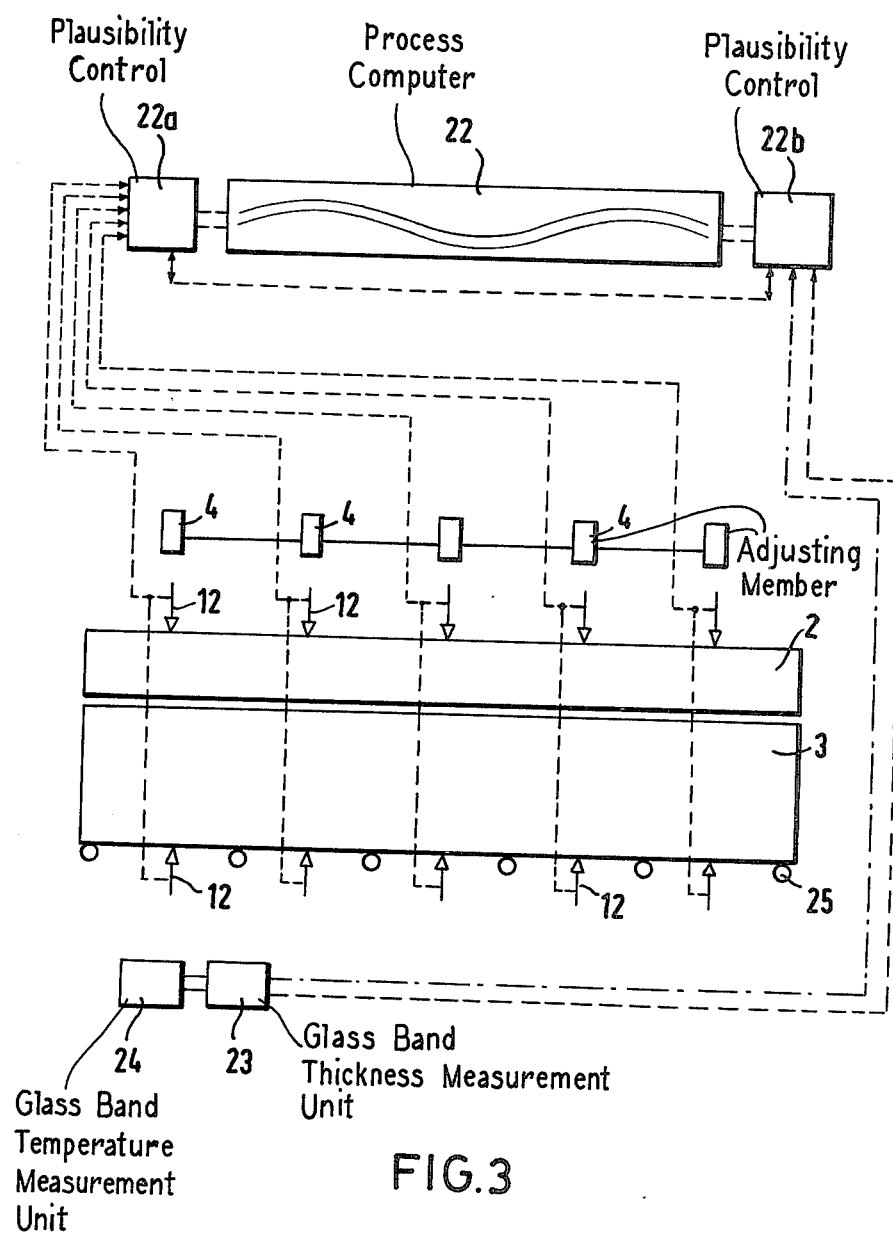
FIG. 3 illustrates the control system for the nozzle.

In FIG. 3, the reference character 22 indicates the process computer with the two pre-connected units 22a and 22b for the plausibility control. These units test the measuring values as to their pausibility which the measuring devices 12, 23 and 24 supply. The measuring devices 12 measure the position of the nozzle bar reference points, while the measuring device 23 measures the thickness of the glass band. The measuring device 24 measures the temperature of the glass band. The units 22a and 22b separate out non-plausible values and replace them through interpolated values which are calculated from the measured extent of the curve. The prepared measuring values are entered in the process computer 22, which, with the aid of the measuring values, controls the adjusting members 4 for the adjustment of the nozzle bar. In order to improve the accuracy of the adjustment of the deflection curve bending line of the controllable bar 2 to the deflection curve bending line of the bar 3 freely deforming, the computer 22 uses a model of the deflection curve bending line stored in the computer. Through the model, the computer may determine the influence of all parts of the nozzle bar 2 through an adjusting command. For the most favorable form of the momentary adjustment of the bar, there is preferably utilized the known smallest square method.

Figure 4:
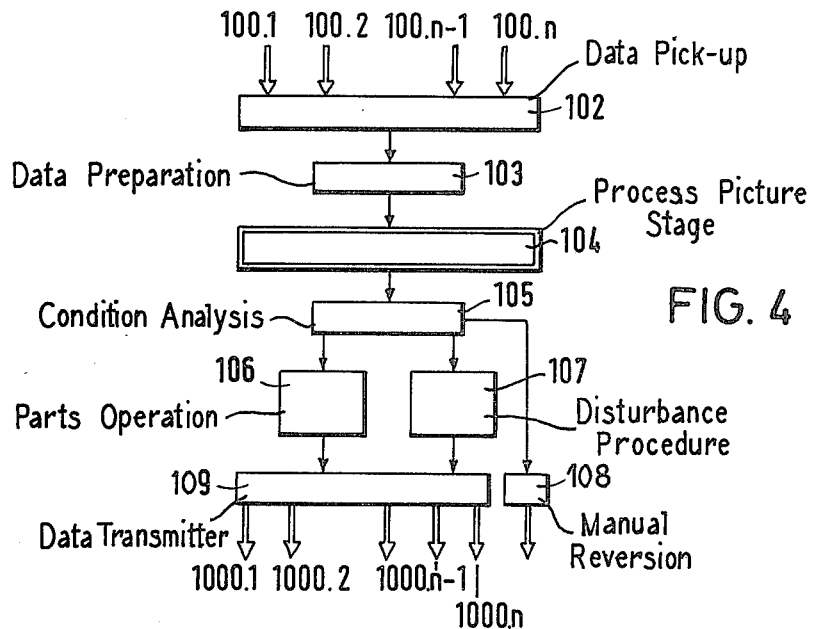
FIG. 4 is a diagrammatic illustration of the entire program structure of the computer.

FIG. 4 illustrates the program structure of the computer and designates 101.1 to 101.n the input measuring values which are first received at the data pick-up stage 102. The data pick-up stage 102 supplies the measuring data of the data preparation stage 103, which also contains the units 22a and 22b and where also the plausibility control is provided and the tendency calculations take place from which the non-measured state of the glass band in the nozzle orifice is calculated. From the measuring data preparation stage 103 the prepared data arrive at the process picture stage 104 with the individual process models, for example the nozzle-bar model, and from here to the condition analysis stage 105. This stage decides whether an operation procedure according to a normal model or a disturbance procedure according to a disburbance model is to proceed and controls correspondingly the parts operation procedure stage 106 or disturbance procedure stage 107. For extreme cases, the manual reversing stage 108 of the condition analysis may also be connected. According to each selection through condition analysis, by the parts operation procedure stage 106 or the disturbance stage 107 data may be supplied to the data transmitter 109 which controls the different adjusting dimensions, generally designated by 1000.1 to 1000.n.

Figure 5:
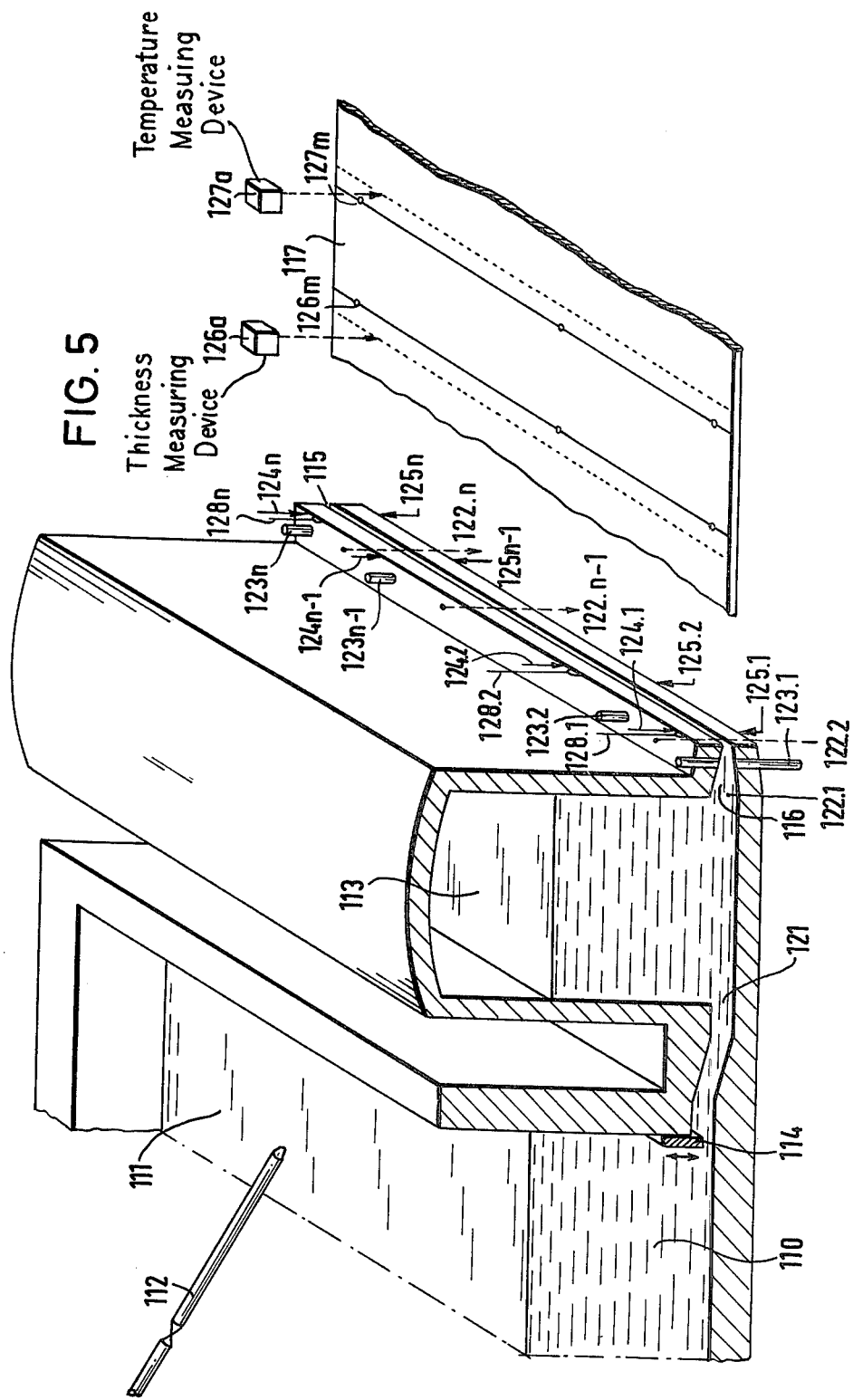
FIG. 5 illustrates a measuring point arrangement in a smelting furnace system including a drawing chamber, nozzle, and glass band.

In FIG. 5, the reference character 111 designates the smelting furnace and 112 the burner devices. To the smelting furnace is attached the drawing furnace 113, which, however, does not always have to be present. The production of glass with a nozzle forming the glass band according to desired dimensions is also possible without a drawing-furnace with adjustable glass level; the nozzle is then arranged directly on the outlet of the refining portion of the smelting furnace. With use of the drawing furnace 113, it is necessary to employ at the outlet of the smelting furnace 111 a regulating member 114 for the flow-through of the glass by which the inflow of the glass is regulated out of the outlet of the smelting furnace 111 into the drawing furnace 113. Between the drawing furnace 113 and the nozzle 115, which has the construction shown in detail in FIG. 2, there is located the nozzle supply channel 116. From the nozzle 115 the glass flows as glass band 117.

Within the molten glass is located at least one measuring point 121 for the measurement of the glass temperature at the furnace outlet as well as at least one measuring point for the measuring of the glass temperature in the drawing furnace 113. The temperature in the nozzle supply channel 116 is measured by means of the measuring points 122.1–122.n. In the nozzle supply channel 116 are further located the heating electrodes 123.1–123.n for the selective heating by which the viscosity of the glass entering into the nozzle 115 is held constant. The temperature measurement through the measuring points 122.1 to 122.n takes place both through the measurement of the electric resistance of the glass smelt in the nozzle supply channel 116 as well as also through thermo-element measurement. The values in the following measuring data preparation are compared in the process computer and are combined into an actual value. An advantage occurs here in that through the double measurement, changes in homogeneousness of the glass may also be simply determined.

The condition of the nozzle orifice 115 is indicated through the measuring devices 124.1–124.n, which correspond with the measuring points 12 in FIG. 3 on the upper side and 125.1 to 125.n on the lower side of the nozzle bars. The thickness of the finished glass band 117 as well as its temperature and temperature distribution is constantly measured through traversing measuring devices 126a and 127a which likewise correspond with the measuring devices in FIG. 3, namely 24 and 23. As thickness measuring device 126a, a laser measuring device is employed and as the temperature measuring device 127a, a pyrometer may be employed. The measuring devices may themselves traverse, however, and operate with a swinging measuring beam (for example, Thermoradiator System) permitting more rapid measuring. The paths of the measuring probes are designated by 126m and 127m. Together with the measurements of the measuring devices 124 and 125, there results with the aid of the thickness measurement and the measurement of the temperature behind the nozzle, a geometrical and thermal picture of the nozzle orifice 115 since the values not directly present are calculated.

Figure 6:
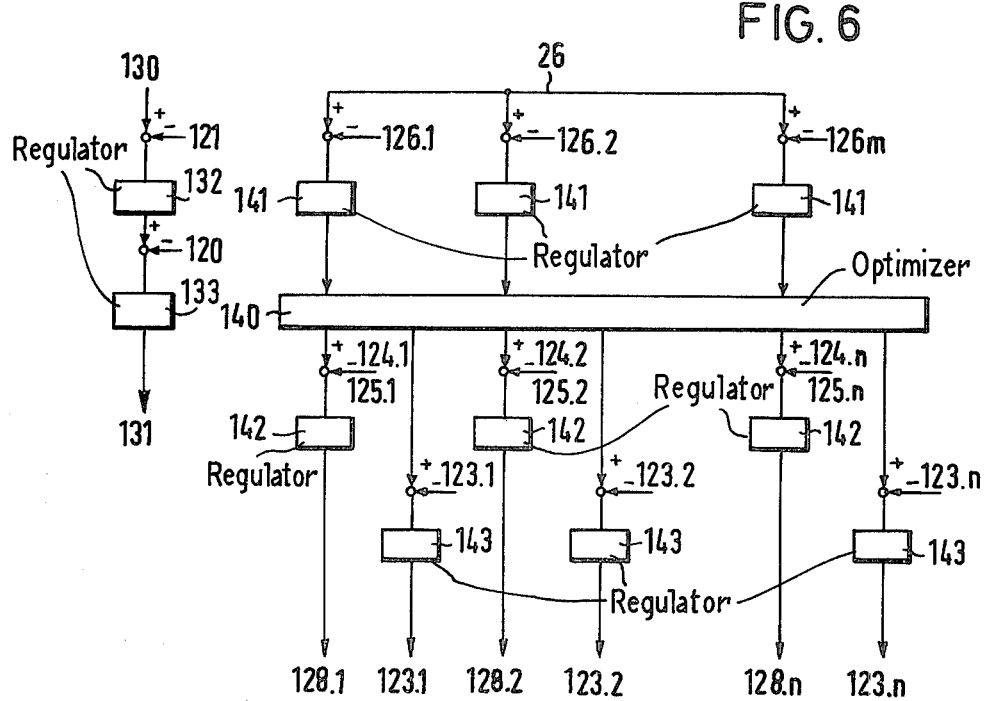
FIG. 6 illustrates the control technology of the system formed of the nozzle feed channel, nozzle, and glass band.

FIG. 6 shows in simplified form the effect of the main control dimensions on one another. The temperature at the end of the smelting furnace 111 is controlled through the fuel feed or, in the case of electric heating, through the electric energy supplies. The burner 112 reproduces symbolically the energy supply. During regulation, the theoretical temperature is imparted to the regulator 132, which it compares with the actual temperature 121 at the end of the drawing furnace, and conveys a signal on to the regulator 133, which, after consideration of the temperature, gives the setting or adjusting command for the energy supply through burner 112. For the preferably independent regulation of the nozzle and the nozzle orifice heating, an energy supply is provided having, with large installations, apparatus for the use of exhaust heat, for example, recuperators and preheating of the mixture. The object of the energy feed regulation is a constant temperature corresponding to the theoretical value in the portion of the smelting furnace which is located directly in front of the nozzle or in front of the drawing chamber, respectively. The theoretical value of the temperature at the end of the smelting furnace is adjusted normally in this connection from the point of view of glass technology and only in exceptional cases according to other criteria. The exception occurs, for example, if the production mixture, in spite of emptying of the full hydrostatic height in front of the nozzle is too small and the glass temperature for raising of the outflow-speed of the glass from the nozzle must be raised.

The control technology combination of the individual control steps is shown by the main portion of FIG. 6. Suggestions for the theoretical value of the nozzle orifice 115, which are determined from the actually measured values 126.1–126.n of the glass band thickness compared with the theoretical value 126, are fed through the regulator 141 to the optimizer 140. The suggestions of regulator 141 are tested by the optimizer 140 with the object of holding the deformation of the nozzle bars as low as possible. For example, with the aid of the method of the smallest squares the most favorable form for the momentary adjustment of the bar is sought, and in the second place through alteration of the viscosity of the smelt in such manner, that deformations of the nozzle bar which have already taken place are made retroactive as far as possible. It is therefore insured that a sufficient adjusting range is always present for the adjusting size of the form of the nozzle bar. The regulators 142 and 143 insure through adjustment of the nozzle bar form with setting commands to the setting members 128.1–128.n or to the electrodes 123.1–123.n, of the maintenance of the theoretical values predetermined by the optimizer for the openings of the nozzle orifice or the glass temperature in the area of the nozzle bar.

The plausibility control, just as the calculation of the condition of the glass in the nozzle 115, is independent of the work of the optimizer 140. Advantageously, however, all functions of the regulator, optimizer, comparators, etc. are combined in one process computer which combines the plurality of individual control devices.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for production of wide bands of plate glass in which glass flows out of a nozzle orifice of a flat nozzle formed by two nozzle bars, comprising the steps of:
   deforming in a controlled manner at least one of the nozzle bars so as to change its form in order to compensate for a distortion of at least one of the nozzle bars.

2. A method for production of plate glass bands according to claim 1 wherein the nozzle bar which is deformed is, as a whole, held in a substantially fixed position and is deformably adjusted to compensate for a form of the other nozzle bar, said other nozzle bar being movable for the adjustment of the overall thickness of the glass band.

3. A method for production of plate glass bands according to claim 1 including the step of continuously measuring the form of at least one of the bars by measurement of a position of previously defined points and using resulting measuring values for control of the bar form.

4. A method for production of plate glass bands according to claim 3 including the further step of feeding the measuring values to a computer which determines the correction values for adjusting members for deformation of the bar form.

5. A method for production of plate glass bands according to claim 4 wherein the computer determines the correction values by use of a stored die shape of the nozzle bar.

6. A method of production of plate glass bands according to claim 3 including the step of continuously measuring a thickness of the glass band behind the nozzle and supplying the measurements as a superimposed regulating dimension to the computer.

7. A method for production of plate glass bands according to claim 3 including the step of conveying the measuring values to a regulating system which together with a thickness of the glass band as a superimposed value, controls after-heating electrodes arranged at the nozzle as well as a geometry of the nozzle.

8. A method for production of plate glass bands according to claim 1 including the further step of controlling heating of a smelting furnace feeding glass to the nozzle so that a glass temperature at an outlet of the smelting furnace remains constant at a pre-selected temperature.

9. A method for production of plate glass bands according to claim 8 including the step of measuring a temperature in a nozzle feed channel between the nozzle and smelting furnace at several places which are distributed in the form of a network uniformly over a cross-section of the feed channel.

10. A method for production of plate glass bands, according to claim 7 including the step of continuously measuring by use of traversing measuring devices operating without contact the temperature and temperature distribution values of the glass band issuing out of the nozzle and submitting the values as corrective dimensions to individual regulators for the after-heating electrodes.

11. A method for production of plate glass bands according to claim 1 wherein the step of deforming one of the nozzle bars in a controlled manner is performed by a process computer which determines from production related measuring values continuously present the tendency of changes in said production related measuring values, and utilizes the tendency for corrective control.

12. A method for production of plate glass bands according to claim 1 in which a process computer is provided which contains process models and through the same calculates the effect of individual adjusting commands for the deformation of the nozzle bar during the course of the process.

13. A nozzle system for the production of a band of plate glass, comprising:
   two nozzle bar means in spaced apart relationship for forming a substantially flat band of plate glass;
   one of the nozzle bar means being elastically deformable; and
   adjusting means connected to control elastic deformation of said one nozzle bar means in accordance with a desired deformation.

14. A nozzle system for the production of a band of plate glass according to claim 13 wherein the elastically deformable bar means is constructed as a thin-walled shell which is clamped on one side and with the adjusting means engaging a free side of the thin-walled shell.

15. A nozzle system for the production of a band of plate glass according to claim 13 in which at least one of the nozzle bar means is provided with means for the supply of heating and cooling media.

16. A nozzle system for the production of a band of plate glass according to claim 13 including computer means for a regulation of a deformation of said one nozzle bar means, said computer means being programmed with a model of the deformable nozzle bar means.

17. A nozzle system for the production of a band of plate glass according to claim 13 in that one of the nozzle bar means is supported at individual points.

18. A method for producing a wide band of flat plate glass in which the glass flows out of a nozzle orifice of a flat nozzle formed of two nozzle bars, comprising the steps of: providing one of the nozzle bars such that a nozzle forming portion is elastically deformable; providing the other nozzle bar such that a nozzle forming portion is rigid; deforming the one nozzle bar elastic nozzle forming portion so as to compensate for distortions in the nozzle forming portion of the other nozzle bar and thereby reduce distortions in the glass band; and adjusting the other nozzle bar as a whole to change an overall width between the two nozzle bars so as to select overall glass band thickness.

19. The method of claim 18 including the step of comparing in a computer means measured point locations along the elastic nozzle forming locations with a desired curvature for the nozzle forming portion.

20. A nozzle system for the production of a band of plate glass, comprising:
a first nozzle bar of substantially rigid construction;
a second nozzle bar of deformably elastic construction comprising a flexible portion;
means connected to the flexible portion for selectively deforming the flexible portion at given spaced locations so as to reduce distortions in the glass band; and
means connected to the second nozzle bar for moving the second nozzle bar so as to adjust overall glass band thickness.

* * * * *

UNITED STATES PATENT AND TRADEMARK OFFICE
CERTIFICATE OF CORRECTION

PATENT NO. : 4,188,200
DATED : February 12, 1980
INVENTOR(S) : Hannes Schulze Horn It is certified that error appears in the above-identified patent and that said Letters Patent are hereby corrected as shown below:

Sheet 1 of the Patent, Correct name of inventor from "Hannes S.Horn" to --Hannes Schulze Horn--.

Signed and Sealed this

Seventeenth Day of June 1980

[SEAL]

Attest:

SIDNEY A. DIAMOND

Attesting Officer

Commissioner of Patents and Trademarks